US009061828B2

(12) United States Patent
Monti et al.

(10) Patent No.: US 9,061,828 B2
(45) Date of Patent: Jun. 23, 2015

(54) HANGING AND CONVEYING DEVICE TO HANG AND CONVEY A VEHICLE BODY IN A MOTOR VEHICLE ASSEMBLY LINE

(71) Applicant: Fiat Group Automobiles S.p.A., Turin (IT)

(72) Inventors: Denny Monti, Turin (IT); Giulio Talarico, Turin (IT); Marco Cavaglia', Turin (IT); Elio Tordella, Turin (IT)

(73) Assignee: Fiat Group Automobiles S.p.A., Turin (IT)

( * ) Notice: Subject to any disclaimer, the term of this patent is extended or adjusted under 35 U.S.C. 154(b) by 0 days.

(21) Appl. No.: 14/125,918

(22) PCT Filed: Nov. 28, 2012

(86) PCT No.: PCT/IB2012/056805
§ 371 (c)(1),
(2) Date: Dec. 12, 2013

(87) PCT Pub. No.: WO2013/080146
PCT Pub. Date: Jun. 6, 2013

(65) Prior Publication Data
US 2014/0224621 A1    Aug. 14, 2014

(30) Foreign Application Priority Data

Nov. 28, 2011   (IT) .............................. TO2011A1095

(51) Int. Cl.
*B65G 17/20* (2006.01)
*B65G 17/16* (2006.01)
*B62D 65/18* (2006.01)
*B65G 17/48* (2006.01)

(52) U.S. Cl.
CPC ................ *B65G 17/20* (2013.01); *B65G 17/16* (2013.01); *B65G 17/485* (2013.01); *B62D 65/18* (2013.01); *B65G 2201/0294* (2013.01)

(58) Field of Classification Search
CPC ........ B65G 17/20; B65G 17/16; B65G 17/32; B65G 17/48; B65G 17/485; B65G 2201/0294; B62D 65/18
USPC .................. 198/465.4, 867.03, 473.1, 803.11
See application file for complete search history.

(56) References Cited

U.S. PATENT DOCUMENTS 4,475,462 A * 10/1984 Tsumaki et al. .............. 105/149
5,234,096 A *  8/1993 Saruki et al. .................. 198/378

(Continued)

FOREIGN PATENT DOCUMENTS

| DE | 100 27 730 A1 | 12/2001 |
| JP | 7-89609 A | 4/1995 |
| WO | WO 2005/077790 A1 | 8/2005 |

*Primary Examiner* — Mark A Deuble
(74) *Attorney, Agent, or Firm* — Dickstein Shapiro LLP

(57) ABSTRACT

A hanging and conveying device comprising a slide slidingly coupled to a guide to move along the guide in a given advancement direction; and a gondola hanging from the slide and comprising an arched member having a first axis parallel to the advancement direction and adjustable in position about the first axis, and coupling means carried by the arched member to engage, during operation, a floor of a vehicle body arranged through the arched member; the coupling means comprising two coplanar longitudinal members provided with pins to couple with and support the vehicle body, and positioning means to cause the pins to be arrangeable on the longitudinal members in a number of selectively engageable alternative positions, to result in different types of vehicle bodies being selective mountable on the arched member.

6 Claims, 2 Drawing Sheets

(56) References Cited

U.S. PATENT DOCUMENTS 5,718,320 A * 2/1998 Marquier et al. .......... 198/345.3
7,461,735 B2 * 12/2008 Nakamura ................. 198/465.4
2004/0206605 A1 * 10/2004 Shibata et al. ............. 198/465.4
2008/0135382 A1 * 6/2008 Nakamura ................. 198/463.2
2008/0223692 A1 * 9/2008 Tanahashi .................... 198/618
2010/0200361 A1 * 8/2010 Tagliavento ............... 198/346.3

* cited by examiner

HANGING AND CONVEYING DEVICE TO HANG AND CONVEY A VEHICLE BODY IN A MOTOR VEHICLE ASSEMBLY LINE

TECHNICAL FIELD

The present invention relates to a hanging and conveying device to hang and convey a vehicle body in a motor vehicle assembly line.

In particular, the present invention relates to a hanging and conveying device comprising a slide slidingly coupled to a guide to move along the guide in a given advancement direction; and a gondola hanging from the slide and comprising an arched member having an axis parallel to the advancement direction and adjustable in position about the axis, and coupling means carried by the arched member to engage, during operation, a vehicle body floor arranged through the arched member.

BACKGROUND ART

In general, in known hanging and conveying devices of the above-described type, the coupling means are specific for a given type of vehicle body; in consequence, a change in the type of vehicle body necessarily entails the reconfiguration of each arched member, by substituting both the mentioned coupling means and their mountings on the arched member.

Obviously, the above-mentioned reconfiguration operations require, on the one hand, quite long line stoppage times and, on the other, the need to store a significant quantity of substitute parts in the warehouse.

To obviate these problems, some solutions have been proposed in the past with the object of adapting the structure of the coupling means to the vehicle body to be carried, and therefore of having to resort to their complete substitution every time.

Solutions of this type are described, for example, in WO2005/077790 and in JP7089609, in which the coupling means comprise a pair of longitudinal members, each of which is equipped at both ends with a pin to couple with and support a vehicle body. To allow the selective mounting of mutually different types of vehicle bodies on the arched member, the distance between the pins on each longitudinal member can be modified either by the telescopic lengthening of the longitudinal member, as in the case of WO2005/077790, or by the sliding of one of the pins of the longitudinal member along a longitudinal guide integral with the longitudinal member, as in the case of JP7089609.

Both of these solutions, besides giving just limited "adaptability" to the arched member, suffer from the drawback of introducing significant structural complexity with the negative consequence of increasing costs and reducing the reliability of the vehicle body hanging and conveying device.

DISCLOSURE OF INVENTION

The object of the present invention is to provide a vehicle body hanging and conveying device devoid of the above-described drawbacks.

According to the present invention, a vehicle body hanging and conveying device for use in a motor vehicle assembly line is provided, as claimed in the appended claims.

BRIEF DESCRIPTION OF THE DRAWINGS

The invention will now be described with reference to the attached drawings, which illustrate non-limitative embodiments, where.

BEST MODE FOR CARRYING OUT THE INVENTION

Figure 1:
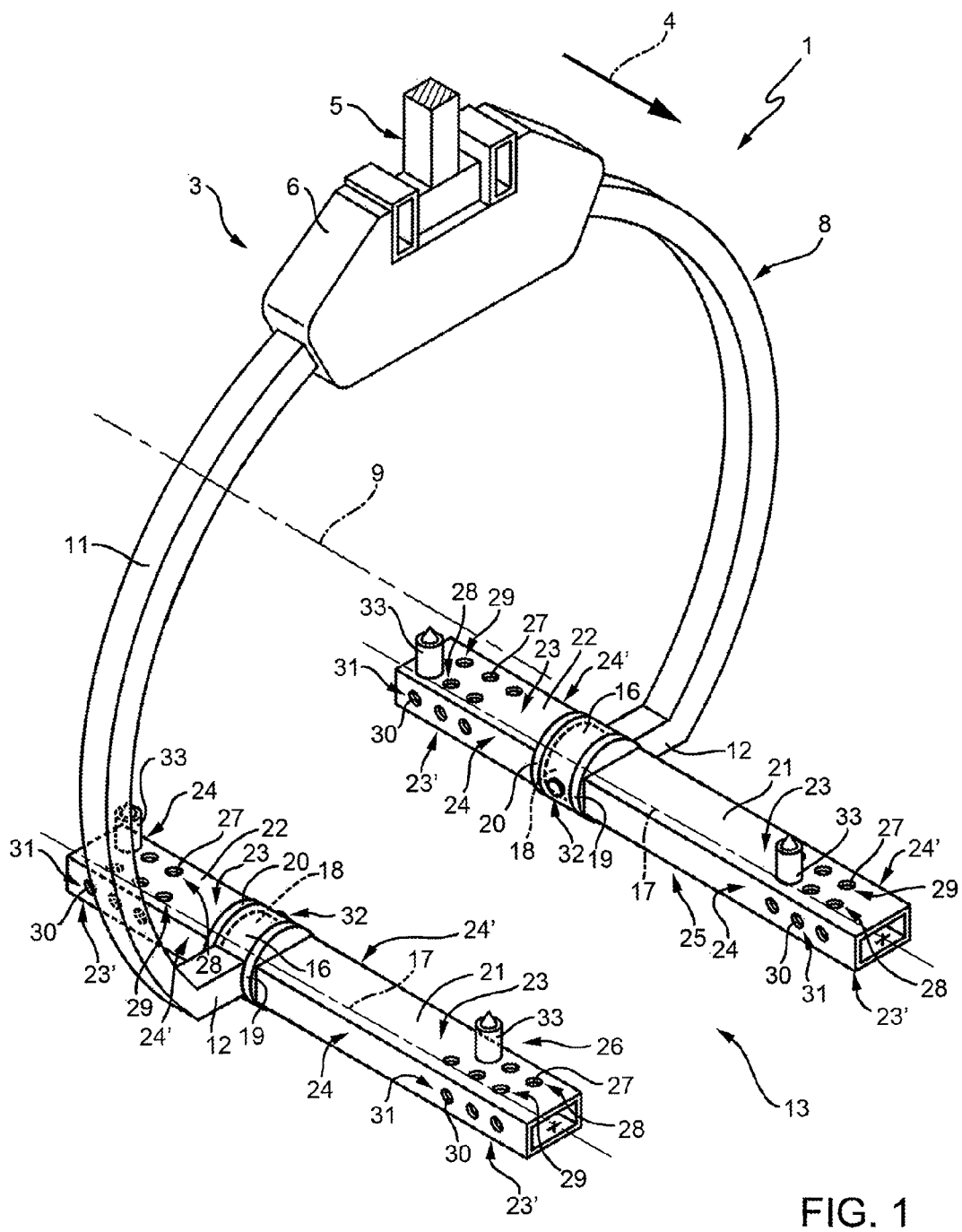
FIG. 1 schematically shows, in a perspective view and with parts removed for clarity, a preferred embodiment of the hanging and conveying device of the present invention.
Figure 2:
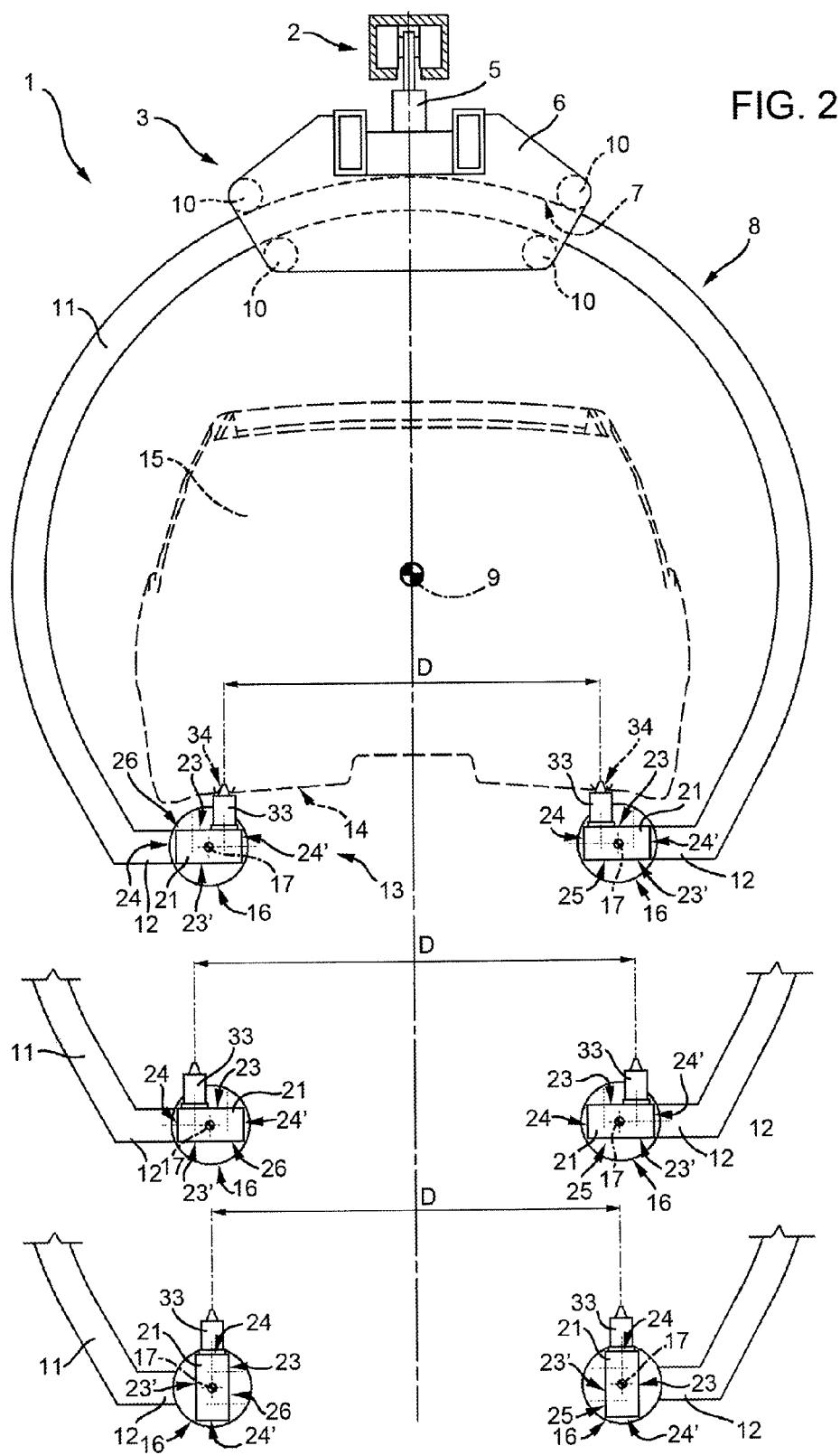
FIG. 2 is a front elevation view of the device in FIG. 1 in different operating conditions.

In FIGS. 1 and 2, reference numeral 1 indicates, as a whole, a motor vehicle assembly line, in this case for cars, comprising a guide 2 and a plurality of hanging and conveying devices 3, only one of which is shown, distributed along the guide 2 so as to move along the guide 2, in a given advancement direction 4.

Each hanging and conveying device 3 comprises a slide 5 slidingly coupled to the guide 2 and supporting a suspended frame 6 defining a guide 7 for a gondola 8 supported by the frame 6. The guide 7 has the form of an arc of a circle extending around an axis 9 parallel to the advancement direction 4, and is defined, in a known manner, by a plurality of support and guide rollers 10; and the gondola 8 comprises an arched member 11, which lies on a plane perpendicular to the advancement direction 4 and is coaxial with axis 9. The arched member 11 slidingly engages the guide 7 to assume different angular positions around axis 9, has a span around axis 9 of approximately 270° and carries, connected to its opposite free ends, respective rectilinear appendages 12, which are mutually coaxial, transversal to axis 9 and facing each other.

The gondola 8 further comprises a coupling device 13, which is suitable for being connected, in use, to the floor 14 of a respective vehicle body 15 arranged through the arched member 11 along axis 9. The coupling device 13 comprises, for each appendage 12, a bush 16, which is integrally connected to the free end of the appendage 12, has an axis 17 perpendicular to the appendage 12 and parallel to the axis 9, and houses a pivot pin 18 (shown with a broken line in FIG. 1), coaxial with axis 17 and connecting together a front flange 19 and a rear flange 20, which are circular, arranged on opposite sides of the bush 16 and coaxial with axis 17.

The flanges 18 and 19 carry respective projecting, integrally connected bars 21 and 22, which are coaxial with each other and axis 17 and have a polygonal cross-section. In the example shown, the bars 21 and 22 have a rectangular cross-section and are bound by two major lateral surfaces 23 and 23' parallel to each other and axis 17, and two minor lateral surfaces 24 and 24' perpendicular to the lateral surfaces 23 and 23' and parallel to axis 17. The two mutually coaxial pairs of bars 21 and 22, together with the associated flanges 19 and 20 and the associated bushes 16, define two longitudinal members 25 and 26, each of which is coaxial with the respective axis 17.

In each of the bars 21 and 22 of each longitudinal member 25, 26, the lateral surface 23 is a perforated surface having, in proximity to the free end of the respective bar 21, 22, a plurality of holes 27 that, in the example shown, are arranged in two rows 28 and 29 parallel to axis 17; while the lateral surface 24 is also a perforated surface having, in proximity to the free end of the respective bar 21, 22, a plurality of holes 30 that, in the example shown, are arranged in single row 31 parallel to axis 17.

By rotating the pivot pins 18 inside the respective bushes 16 around the respective axes 17 in a known manner, by hand or with a specially provided motorized tool, and then angularly locking the pivot pins 18 via respective radial-pin locking devices 32 mounted through the respective bushes 16, it is possible to arrange the bars 21 and 22 of each of the longitudinal members 25 and 26 such that the respective perforated lateral surfaces 23, 24 are arranged facing axis 9 and therefore, in use, towards the floor 14 of the vehicle body 15.

Each of the holes 27 is selectively engageable by a pin 33 of fixed or adjustable length, which is able to cooperate with a respective hole 34 made in the floor 14 to lock the vehicle body 15 in a given longitudinal position along axis 9 with respect to the gondola 8.

In particular, by selecting the angular position of each of the longitudinal members 25 and 26 around the respective axis 17 such that the respective perforated lateral surfaces 23 or 24 are coplanar to each other and facing axis 9, and selecting particular holes 27 or 30 on these perforated surfaces for mounting the respective pins 33, it is possible to arrange each pin 33 carried by one of the longitudinal members 25 and 26 at a given distance D, chosen from at least three different distances D, from the corresponding pin 33 carried by the other longitudinal members 25 and 26.

Since the rows 28, 29 and 31 allow the distance of the pins 33 from the respective bushes 16 to be changed, the use of perforated longitudinal members 25 and 26 capable of selectively assuming a number of angular positions around the respective axes 17 solves the technical problem of adapting, in a simple and relatively rapid manner, the hanging and conveying device 3 to a relatively large number of vehicle bodies 15 of different sizes without requiring the use of substitute parts and/or materials.

Obviously, the solution, provided by way of example and illustrated in FIGS. 1 and 2, to the above-described technical problem allows an infinite number of variants, all having in common, on the one hand, the feature of comprising an arched member (in the example shown, arched member 11) equipped with two longitudinal members (in the example shown, longitudinal members 25 and 26) that are coplanar to each other and, together, define at least one platform equipped with a support and coupling pin 33 for a vehicle body 15; and, on the other, the feature constituted by the fact that the longitudinal members (25 and 26) are equipped with positioning means (in the example shown, holes 27 and 30 and the rotating coupling of the longitudinal members 25 and 26 to the respective bushes 16) able to allow arranging the pins 33 in a large number of alternative positions that can be selectively occupied by the pins 33, so as to render the aforementioned platform able to allow the selective mounting of mutually different types of vehicle bodies 15.

With this in mind, a variant, not shown, of the hanging and conveying device 3 could, for example, comprise two longitudinal members 25 and 26 that are fixed with respect to the arched member 11 and coplanar to each other to define, on the arched member 11, a platform for mounting a vehicle body. Each longitudinal member 25, 26 is defined, as in the example shown, by two bars 21 and 22, coaxial with each other and the respective axis 17, and each equipped with respective positioning means comprising, in this case, a carousel coplanar with the other carousels, provided with a single eccentric pin 33 facing axis 9 and rotating on the respective bar 21, 22 about an axis that extends perpendicularly to the respective axis 17 and the position of which is adjustable along axis 17.

On each carousel, the respective pin 33 could be fixed; alternatively, each carousel could be equipped with a certain number of holes, similar to holes 27 and 30, in different positions, in the radial direction, on the carousel and selectively engageable by pin 33.

According to another variant not shown, the bars 21 and 22 of the longitudinal members 25, 26 have a telescopic structure, which offers the advantage of not only changing the axial position of the holes 27 and 30 in a rapid and simple manner, but also of adjusting the overall length of the longitudinal members 25 and 26 to the type of vehicle body being worked on, so as to reduce axial bulk in the case of small-sized vehicle bodies.

The invention claimed is:

1. A hanging and conveying device to hang and convey a vehicle body in a motor vehicle assembly line, the hanging and conveying device comprising a slide slidingly coupled to a guide to move along the guide in a given advancement direction; and a gondola hanging from the slide and comprising an arched member having a first axis parallel to the advancement direction and adjustable in position about the first axis, and coupling means carried by the arched member to engage, during operation, a floor of a vehicle body arranged through the arched member; the coupling means comprise two coplanar longitudinal members with pins to couple with and support the vehicle body; and positioning means to cause the pins to be arrangeable on the longitudinal members in a number of selectively engageable alternative locations, to result in different types of vehicle bodies being selectively mountable on the arched member; the hanging and conveying device is characterized in that the positioning means comprise, for each longitudinal member, a plurality of seats distributed along the longitudinal member and each selectively engageable by a respective pin.

2. The device according to claim 1, wherein each longitudinal member has a respective second axis parallel to the first axis and a polygonal cross-section, and is laterally bounded by longitudinal lateral surfaces; the seats are provided on at least two of the longitudinal lateral surfaces; and the positioning means further comprise rotational coupling means to rotatably couple each longitudinal member to a respective end of the arched member; to cause each longitudinal member to be rotatable, with respect to the arched member, about the respective second axis, and angular locking means to selectively lock each longitudinal member in at least two given angular positions with respect to the arched member.

3. The device according to claim 2, wherein the rotational coupling means are arranged along the respective longitudinal member in an intermediate position to define, along the longitudinal member, two bars coaxial with each other and to the respective second axis, and each provided with a respective pin.

4. The device according to claim 2, wherein each longitudinal member has a rectangular transversal cross-section and is laterally bounded by two major longitudinal lateral surfaces and two minor longitudinal lateral surfaces the seats are provided on at least one major longitudinal lateral surface and on at least one minor longitudinal lateral surface.

5. The device according to claim 4, wherein the seats provided on the major longitudinal lateral surface are arranged in two rows parallel to the second axis.

6. The device according to claim 4, wherein the seats provided on the minor longitudinal lateral surface are arranged in one row parallel to the second axis.

* * * * *